United States Patent
Ashton

(10) Patent No.: US 6,758,968 B2
(45) Date of Patent: Jul. 6, 2004

(54) FLUID CONDUIT WITH RETAINED MAGNETS

(76) Inventor: Thomas E. Ashton, 7660 Glenmont Dr., North Royalton, OH (US) 44133

( * ) Notice: Subject to any disclaimer, the term of this patent is extended or adjusted under 35 U.S.C. 154(b) by 0 days.

(21) Appl. No.: 10/174,659

(22) Filed: Jun. 19, 2002

(65) Prior Publication Data

US 2002/0189991 A1 Dec. 19, 2002

Related U.S. Application Data

(60) Provisional application No. 60/299,076, filed on Jun. 19, 2001, and provisional application No. 60/299,077, filed on Jun. 19, 2001.

(51) Int. Cl.[7] .............................. C02F 1/48; B01D 35/06

(52) U.S. Cl. ........................................ 210/222; 210/232

(58) Field of Search ................................. 210/222, 232, 210/695; 123/538

(56) References Cited

U.S. PATENT DOCUMENTS 5,348,050 A  *  9/1994  Ashton ........................ 210/222
6,123,843 A  *  9/2000  Schoepe ...................... 210/222

* cited by examiner

*Primary Examiner*—David A Reifsnyder
(74) *Attorney, Agent, or Firm*—Renner, Kenner, Greive, Bobak, Taylor & Weber

(57) ABSTRACT

A device for holding magnets in place and concentrating the fields of the magnets to the center of a conduit that is aligned laterally between the magnets.

9 Claims, 3 Drawing Sheets

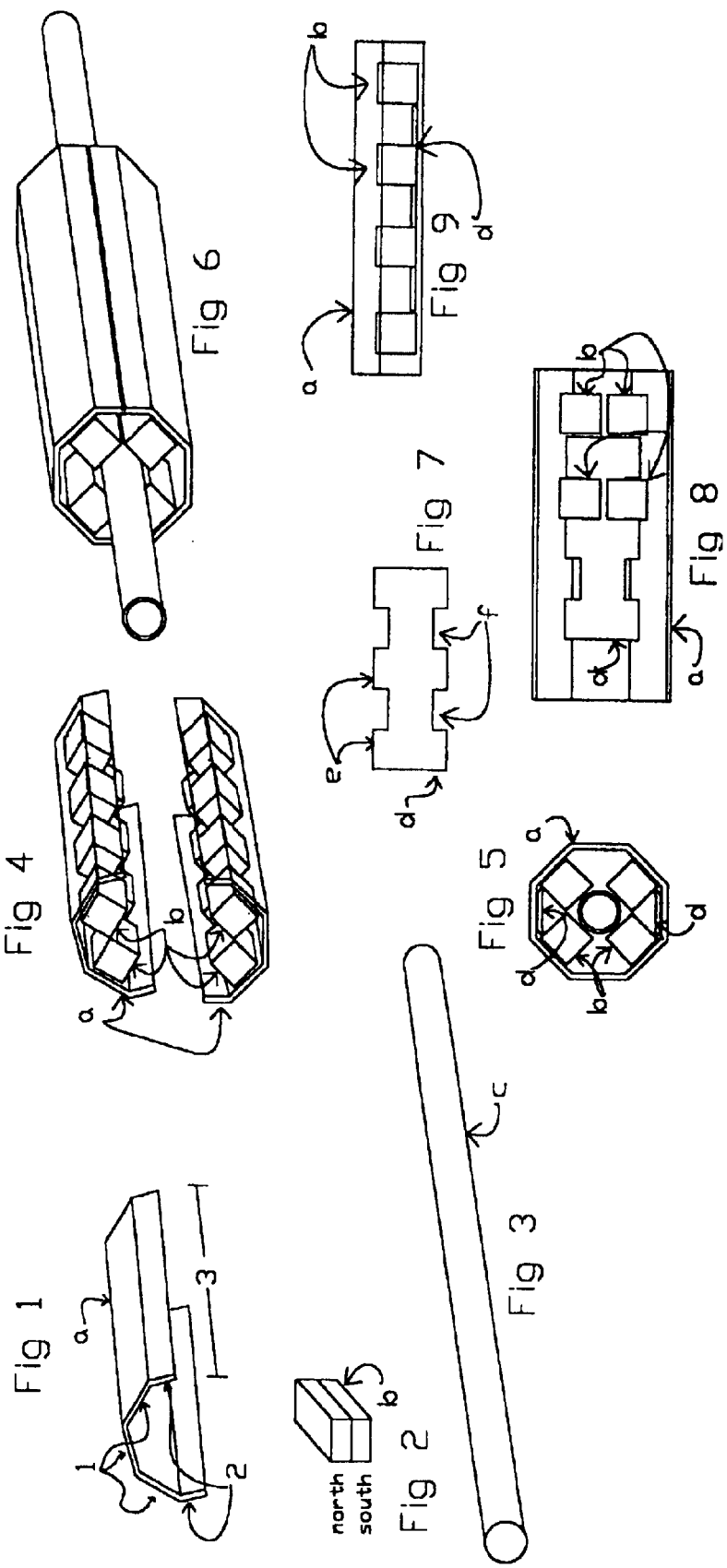

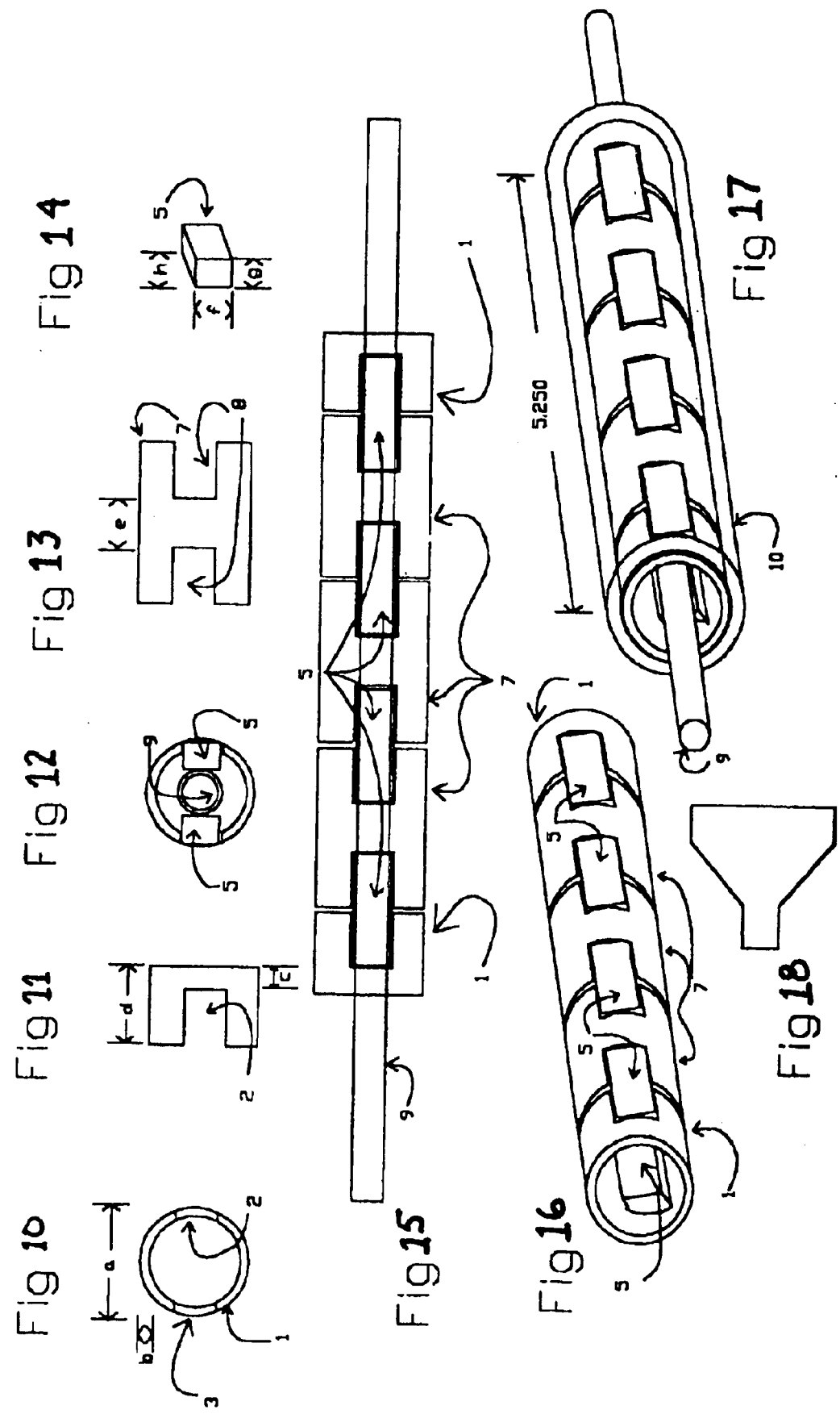

FLUID CONDUIT WITH RETAINED MAGNETS

RELATED US APPLICATIONS

This application claims the benefit of priority to U.S. Provisional Application Serial Nos. 60/299,076, filed on Jun. 19, 2001, and 60/299,077 filed on Jun. 19, 2001, both of which are incorporated herein by reference.

TECHNICAL FIELD

The invention herein resides in the art of fluid treatment devices and, more particularly, to such devices that treat flowing fluids magnetically. Specifically, the invention relates to holders for magnets in such fluid treatment devices to assure the proper placement and retention of the magnets with respect to the fluid conduit, and to aid in the manufacturing and assembly of such fluid treatment devices.

BACKGROUND OF THE INVENTION

It is well known in the art of magnetics that the strength of the magnetic flux decreases as the inverse square of the distance from the face of the magnetic poles. Additionally, the thickness of a magnet will determine how far the magnetic fields will extend beyond the surface of the magnet. To illustrate the above statement, a magnet 1" thick by 3" long that is magnetized through the 3" dimension with the north magnetic pole at the top and the south magnetic pole at the bottom, with a gauss reading of 1000 g at the surface will be used. At a distance of ½" above the surface, the reading is 400 g. Compare this with the magnetic field of the earth being approximately ½ of 1 gauss. The earth being approximately 8000 miles in diameter has a magnetic field that extends thousands of miles into space. Thus both the size of a magnet, mass and thickness, and the strength, determine how far the fields will reach. For these reasons in magnetic fluid treatment devices, the thickness of the magnets must be at least as great as the radius of the conduit carrying fluid through the device.

To build an effective fluid treatment device, it is important to maintain strong magnetic fields at the center of the conduit that carries the fluids to be treated. Other methods can be used to further increase the useful strength of magnets. To further increase the strength of a magnet, a ferrous steel plate that completely covers one pole of the magnet will cause an increase of gauss at the other pole. Using the above described magnet (1000 gauss) as another example, when one pole is covered the other pole reads 1200 g at the surface, and the reading at ½" above the surface is 480 g Further, by arranging two magnets on a ferrous steel backing plate where they are in close proximity to each other, and at an angle to each other of approximately 35 degrees, while the gauss reading at the surface of the magnets will be reduced approximately 10% to 900 g, the reading at a distance equal to the thickness of the magnet, which corresponds to the center of a conduit that would be used to carry fluids through the device, will conversely be approximately 10% (500 g) higher than a reading at the same distance of a single magnet on a ferrous backing plate.

To further enhance magnetic flux effectiveness, one may construct a device comprising an identical configuration of magnets with a backing plate placed diametrically opposite to the first configuration and with the opposite magnetic pole facing the first magnet. This will again increase the gauss readings of both magnets by an additional 10%. In this configuration, the backing plates must contact each other along the edges so that a complete circuit of magnetic flux can be maintained between the first set of magnets with one pole against the backing plate and the other set of magnets where the opposite pole is against the backing plate. This configuration creates a continuous circuit of magnetic flux that travels from the north pole face of the first magnet, through the space into the south pole of an opposite second magnet, through the second magnet, around the ferrous steel backing plates, and ultimately back into the south pole of the first magnet. The circuit, now being complete, increases the flux density of the magnetic field and has a stronger influence on the material passing between the poles of the magnets of this device.

The next consideration is the placement of additional sets of magnets with opposing polarities facing each other. The set of magnets following the first set is placed downstream in relation to the direction of flow of the fluid, and at a separation distance that is greater than ⅓ the length of the magnets but no more than 12 the length of the magnets. Additionally, the second set is preferably separated from the first set by a distance that is greater than the distance through the conduit and between the magnets At a lateral separation distance of less than the distance through the conduit, the magnetic flux will travel laterally between magnets mounted on the same backing plate rather than through the conduit, and therefore not affect the fluid. This distance through the conduit is given precedence over the concept of the distance between the magnets on the same backing plate being separated by a distance of at least ⅓ the length of the magnets. Following sets of magnets conform to this restriction so that the fluid encounters at least four reversing polarities as it travels through the conduit. The width of the magnets must be equal to or greater than the diameter of the conduit carrying the fluid.

It is clear that a system is needed to facilitate the assembly of magnetic fluid treatment devices where multiple magnets are assembled into a shell. The device should hold magnets in proper alignment for ease of assembly and further maintain the positions of the magnets while in use. The configuration of the components should also concentrate the fields of the magnets to the center of a fluid conduit.

DISCLOSURE OF THE INVENTION

In light of the foregoing, it is a first aspect of the invention to provide a fluid conduit with retained magnets that maximizes the magnetic flux introduced into an associated fluid stream.

Another aspect of the invention is the provision of a fluid conduit with retained magnetics that provides for ease of assembly and assurance of maintenance of spatial relationships between and among the elements thereof.

Still a further aspect of the invention is the provision of embodiments of a fluid conduit with retained magnets that is durable and reliable in use and easily constructed from state-of-the-art materials, while achieving the foregoing benefits. The foregoing and other aspects of the invention that will become apparent as the detailed description proceeds are achieved by a fluid treatment conduit assembly, comprising: an elongated housing of cross sectional octagonal configuration, said housing having eight elongated axially aligned inner directed faces; a conduit maintained within and axially aligned with said housing; a plurality of magnets interposed between said conduit and said inner directed faces; and a plurality of said spacers being interposed between axially adjacent ones of said magnets.

Other aspects that will become apparent herein are attained by a fluid treatment conduit assembly, comprising:

an elongated tubular shell; a conduit maintained within and coaxial with said shell; a plurality of magnets interposed between said conduit and said shell; and a plurality of spacers received within said shell, said spacers receiving and maintaining said magnets in fixed spaced apart relationship to each other, said magnets being maintained in radially aligned pairs, and said pairs being axially spaced and aligned.

BRIEF DESCRIPTION OF THE DRAWINGS

For a complete understanding of the objects, techniques and structure of the invention, reference should be made to the following detailed description and accompanying drawings, wherein:

FIG. 1 is a perspective view of a backing plate used with a first embodiment of the invention;

FIG. 2 is a perspective view of a permanent magnet employed with a first embodiment of the invention;

FIG. 3 is a perspective view of the fluid conduit employed with the first embodiment of the invention;

FIG. 4 shows a pair of backing plates receiving a permanent magnet in accordance with the first embodiment of the invention;

FIG. 5 is an end view of FIG. 4 with the conduit in place and the backing plates closed;

FIG. 6 is a perspective view of the assembly of FIG. 5;

FIG. 7 is a plan view of a spacer used with the first embodiment of the invention;

FIG. 8 is a top illustrative view of a backing plate with spacers and magnets in place;

FIG. 9 is a side illustrative view of the backing plate with spacers and magnets in place as set forth in FIG. 8;

FIG. 10 is a top view of an end spacer according to the second embodiment of the invention;

FIG. 11 is a side view of the end spacer;

FIG. 12 is an end view of the end spacer of FIG. 10, with the magnets and the non-ferrous conduit in place;

FIG. 13 is a side view of the center spacer according to the second embodiment of the invention;

FIG. 14 is an illustrative view of the magnet employed in the second embodiment of the invention;

FIG. 15 is a side view of the components of FIGS. 10–14 assembled;

FIG. 16 is a perspective view of the assembly of FIG. 15, without the non-ferrous conduit in place so that the position of the magnets on both sides of the assembly can be seen;

FIG. 17 depicts the assembly of FIG. 15 with the non-ferrous conduit and ferrous steel shell in place;

FIG. 18 is a perspective view of the end cap of the second embodiment of the invention;

PREFERRED EMBODIMENT FOR CARRYING OUT THE INVENTION

Figure 19:
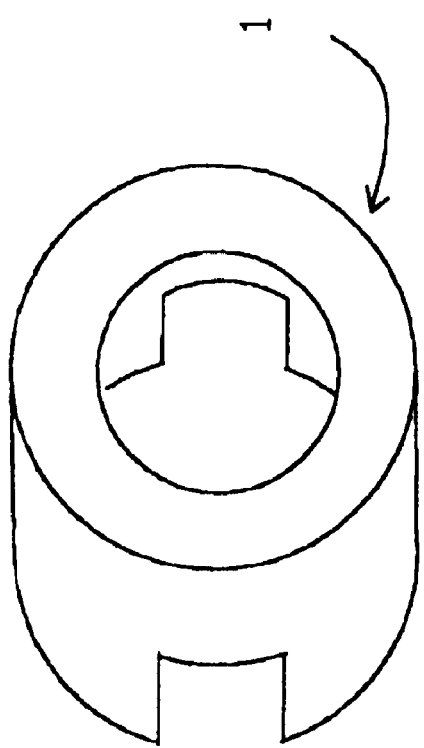
FIG. 19 is a perspective view of the end spacer of the second embodiment of the invention.
Figure 20:
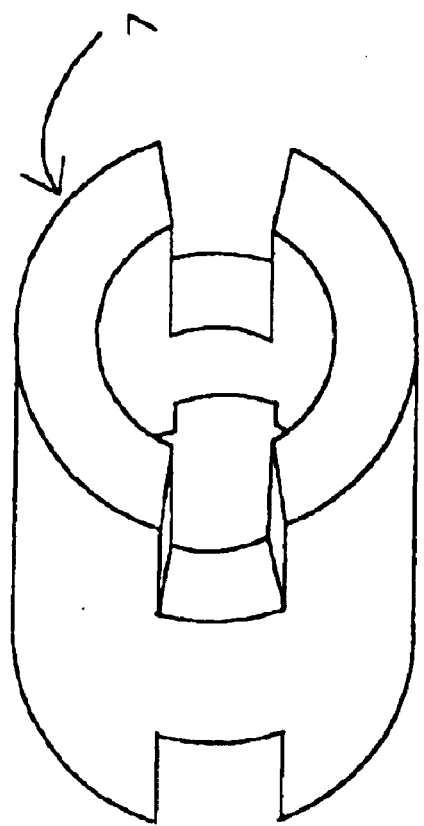
FIG. 20 is a perspective view of the center spacer of the second embodiment of the invention.

With reference now to the drawings and more particularly FIGS. 1–9, it can be seen that a first embodiment of the invention comprises an assembly for holding magnets in place to facilitate the manufacture of magnetic fluid treatment devices that is comprised of two ferrous steel backing plates, spacers, a ferrous steel outer shell, end caps and a conduit to carry the fluids to be treated. The purpose of the device is to hold an array of magnets arranged in a specific order and with specific distances between each individual magnet. The magnets are arranged on the ferrous steel backing plate with the spacers positioning the magnets therealong. They are then inserted into a ferrous steel housing, the combination of which concentrates and directs the flux of the magnets to produce maximum effect. A non-ferrous conduit is also affixed to the magnets and centered thereon.

The spacer is positioned on the ferrous steel backing plate so that the first magnet is 1/8" inwardly from an end of said plate. The first set of the magnets is placed on the ferrous steel plate and serves to hold the spacer in position so that each succeeding set of magnets is then easily positioned properly so that the distance between each row of magnets is 1/2". These magnets, when affixed to the ferrous steel backing plate, concentrate their effective strength. The bar configuration magnets are magnetically charged so that the entire length of each magnet is of either north or south pole as opposed to the traditional configuration of magnetic poles on opposite ends of the bar magnet. The magnets are then arranged on each backing plate so that the first set of magnets has the north pole against the backing plate and the second set of magnets has the south pole against the backing plate. This arrangement of alternating polarity is continued for the full length of the device. Two assemblies of magnets on the backing plates are placed together so that the magnets diametrically opposed to each other are of opposite polarities and therefore attract each other.

A non-ferrous conduit of sufficient length to extend 2" beyond the ends of the assemblies is installed between the magnets and backing plate assemblies so that it is in contact with the magnets and is parallel to the long axis of the assembly and is affixed thereto with a suitable adhesive.

Each set or row of magnets is spaced a distance from the successive row so that the distance between rows is at least equal to or exceeds the thickness of the magnets or exceeds one half of the length of the magnets, whichever is greater. These distances, specifically for this illustration, are 1/2" between rows. Additionally, when the assemblies are brought together on the non-ferrous conduit, the distance between the magnets diametrically opposed to each other on opposite sides of the conduit is no greater than the combined thickness of the magnets opposing each other. This distance, as pertains specifically to this illustration is 1/2". Further, the total thickness of the magnets that are diametrically opposite each other when combined, must equal or exceed the diameter of the non-ferrous conduit so that the magnetic fields will be attracted to each other though the conduit and perpendicular thereto, rather than being attracted to each other laterally as arranged along the conduit. This distance, as pertains specifically to this illustration is 1/2".

Since the magnets are arranged so that the first set of magnets installed on the backing plate as depicted in FIG. 1 and FIG. 2 are arranged so that the entire lateral length of one magnet is of north pole and faces inwardly toward the non-ferrous conduit, and the entire lateral length of the magnet diametrically opposite the first magnet is configured so that the south pole faces inwardly toward the non-ferrous conduit, they attract each other and produce a magnetic field perpendicular to the fluid flow. Further, since the second set of magnets that are installed on the backing plate as depicted in FIG. 4 are adjacent to the first set and are reversed in polarity arrangement so that the first magnet on a given side of the conduit has the north pole facing the conduit, the second magnet as installed on the same backing plate has the south pole facing the conduit with the magnet diametrically opposite the magnet having the north pole facing the conduit. This pattern or reversing polarity of every other magnet facing the non-ferrous conduit continues for the entire length of the device. Likewise, every magnet diametrically opposed to every other magnet on opposite sides of the non-ferrous conduit are of the opposite polarity.

The configuration just described creates curtains of alternating polarities through the non-ferrous conduit. If the distance between the magnets that are configured laterally along the device are less than the distance between the magnets that are diametrically opposed to each other through the non-ferrous conduit, the magnetic fields would attract each other laterally along the direction of the conduit rather than directly through the conduit perpendicularly to the flow of the fluid. This configuration would render the device ineffective.

While this device is designed specifically to facilitate the manufacture of magnets 1" long by ½" thick by ½" wide, anyone skilled in the art would understand that a similar device could be used to hold magnets of virtually any size that are to be installed into a shell of the appropriate size. Whatever size magnets are used, the holding device is constructed so that the ratio between the magnets and the space between them is maintained and that the assembly procedures are facilitated. The holding device is constructed so that when the assembly is complete, the distance between the magnets that are on diametrically opposite sides of the conduit must be less than the distance between the magnets as they are positioned laterally along the device and aligned with the non-ferrous conduit.

With specific reference to the drawings, it can be seen that FIG. 1 illustrates the configuration of each ferrous steel plate a to be one half of an octagon with the three larger flat surfaces 1 being 0.550" and the short surfaces 2 being 0.275" and the length 2 being 6".

The dimensions and polarity of the magnets b, used in this invention are as shown in FIG. 2. The magnet is ½" wide by ½" high by 1" long and is magnetized through the long axis.

As shown in FIG. 3, the conduit c of the first embodiment of the invention is preferably a non-ferrous 316 stainless steel conduit having a ½" diameter and being 12" long.

FIG. 4 illustrates magnets b installed on the ferrous steel backing plate 1 of the holding device. The two magnets b on top are configured so that the north poles of the magnets b are in contact with the ferrous steel backing plate a and the south pole is facing the non-ferrous conduit c. The two magnets b on the bottom of an identical backing plate a are configured to that the south poles of the magnets b are in contact with the ferrous steel backing plate a and the north pole is facing the non-ferrous conduit. The magnets b are installed ⅛" back from the end of the backing plate a. The second row of magnets b is configured on the top backing plate a so that the south poles of said magnets b face the non-ferrous conduit c and the north poles of the magnets b face the ferrous backing plate a. This pattern of alternating polarity continues for the full length of the backing plate a. This configuration creates magnetic fields perpendicular to the non-ferrous conduit c that are orthogonal to the flow of fluid through the conduit.

For further illustration, FIG. 5 presents an end view of the assembly as illustrated in FIG. 4 with the ferrous steel backing plate a, the spacer d, four of the magnets b and the non-ferrous conduit c in place as would be assembled in the final configuration.

With reference to FIG. 7 it can be seen that a spacer is positioned in the center of the backing plate a and is used to properly space the magnets 6 on the plate to facilitate manufacturing precision and efficiency. The six tabs e on the spacer d are each 0.500" wide and 0.125" high. The distance between the tabs f is 0.510". The spacer may be either ferrous or non-ferrous material and is 0.125" thick. FIG. 8 illustrates a top view of the backing plate a with the spacer d in position and holding four of the magnets in place. FIG. 9 illustrates a side view of the backing plate a with the spacer d in position and holding of the magnets b in place.

With reference to FIGS. 10–20 an appreciation can be attained with respect to a second embodiment of the invention.

The device of the second embodiment is comprised of a series of non-ferrous spacers that are formed to hold 1" long by ½" wide by ½" thick magnets in alignment so that they can be further assembled in a ferrous steel shell. The device consists of two identically shaped components that are assembled at each end of the device, and three identically shaped components that are assembled at the center of the device between the end components. All components are arranged so that the magnets are held in place along a line that bisects each magnet along the 1" length. A non-ferrous conduit is affixed inside the assembly with the ends of the conduit extending for a suitable distance beyond each end. This assembly is then inserted into a ferrous steel shell and end caps that fit snugly to both the steel shell and the non-ferrous conduit are affixed to each end.

FIG. 10 depicts the end spacer 1 as seen from the end. The outer diameter A of the spacer is 1.750" with a wall thickness B of 0.125". Two sections of 0.520 wide and 0.500 deep are cut out diametrically opposite each other and are shown as 2 and 3. As seen in FIG. 11, the distance c from the bottom of the removed section to the end of the spacer is 0.250" thereby making the overall length d of the spacer 0.750".

FIG. 12 depicts the end spacer with the magnets 5 in place as they would be for final assembly into a shell. A non-ferrous conduit 9 is shown in position between the magnets.

FIG. 13 depicts the center spacer 7 as seen from the side, with four sections 8 removed, although only two are depicted in this view. The sections removed are 0.520" wide and 0.500" deep. Two identical sections are removed diametrically opposite the two sections shown. A section e of the spacer between the two sections removed is 0.750". The overall length of the spacer is 1.750". FIG. 14 illustrates the size fo the magnet 5 used in this embodiment and is shown to be 0.500" high f by 0.500" wide g by 1.00" long h.

The device assembled with the configuration of the spacers arranged properly is shown in FIG. 15. The two end spacers 1 have the open ends in which the magnets (FIG. 5) are located, facing each other and with the magnets 5 aligned along an imaginary line that passes through the center of each along their length. The center spacers 7 are arranged so that the cut out sections 8 are aligned with the end spacers 1 and each spacer abuts with the next spacer forming a rigid structure with each magnet 5 being in contact with two spacers. A non-ferrous conduit 9 is shown in position through the assembly with each end extending a suitable distance beyond the assembly, and is held in place with a suitable adhesive.

FIG. 16 presents a perspective view of the assembly of the end spacers 1, center spacers 7 and magnets 5 as just discussed. Detailed view of the end spacer 1 and the center spacer 7 can be obtained from FIGS. 19 and 20, respectively.

FIG. 17 is a perspective view of a 5.250" long and 1.800" ID, with 0.062" wall thickness, ferrous steel shell 10 with the assembly (FIG. 7) inserted into the shell and the non-ferrous conduit 9 in position. The shell serves to contain the assembly and direct and concentrate the magnetic fields to the center of the conduit 9. Further, FIG. 19 depicts an end cap that is installed over each end of the complete assembly with the large end fitting snugly over the ferrous steel shell and the small end fitting snugly over the non-ferrous conduit installed inside the assembly.

While the device of this second embodiment is designed specifically to facilitate the manufacture of magnets 1" long by ½" wide, persons skilled in the art would know that a similar device could be used to hold magnets of virtually any size that are to be installed into a shell of the appropriate size. Whatever size magnets are used, the ratio between the magnets and the space between them is a consideration of the spacers and the device when fully assembled. The distance between the magnets that are on diametrically opposite sides of the conduit must be less than the distance between the magnets as they are positioned laterally along the device and aligned with the non-ferrous conduit.

Further, the total thickness of the magnets that are diametrically opposite each other, as would be measured from the inside wall of the ferrous steel shell and the non-ferrous conduit, when combined, must exceed the diameter of said conduit so that the magnetic fields will be attracted to each other through the conduit and perpendicularly thereto, rather than being attracted to each other laterally as arranged along the conduit. Since the magnets are arranged so that the first set of magnets installed in the first spacer as depicted in FIG. 10 and FIG. 11, are arranged so that the entire lateral length of one magnet is of north pole and faces inwardly toward the non-ferrous conduit, and the entire lateral length of the magnet diametrically opposite the first magnet is configured so that the south poles faces inwardly toward the non-ferrous conduit, they would attract each other and produce a magnetic field perpendicular to the fluid flow. And since the second set of magnets that are installed in the end of the spacer depicted in FIG. 13 so that they are adjacent to the first set and are reversed in polarity arrangement so that the first magnet on a given side of the conduit has the north pole facing the conduit, the second magnet as installed in the second spacer would have the south pole facing the conduit with the magnet diametrically opposite the magnet having the north pole face the conduit. This pattern of reversing polarity of every other magnet facing the non-ferrous conduit continues for the entire length of the device. Likewise, every magnet diametrically opposed to every other magnet on the opposite sides of the non-ferrous conduit is of the opposite polarity. This configuration creates curtains of alternating polarities through the non-ferrous conduit. If the distance between the magnets that are configured laterally along the device were less than the distance between the magnets that are diametrically opposed to each other through the non-ferrous conduit, the magnetic fields would be attracted to each other laterally along said conduit rather than directly through said conduit perpendicular to the flow of the fluid.

Thus it can be seen that the objects of the invention have been satisfied by the structure presented above. While in accordance with the patent statutes only the best known and preferred embodiments of the invention have been presented and described in detail, the invention is not limited thereto or thereby. Accordingly, for an appreciation of the true scope and breadth of the invention, reference should be made to the following claims.

What is claimed is:

1. A fluid treatment conduit assembly, comprising:

an elongated housing of cross sectional octagonal configuration, said housing having eight elongated axially aligned inner directed faces;

a conduit maintained within and axially aligned with said housing;

a plurality of magnets interposed between said conduit and said inner directed faces;

a plurality of spacers, said spacers being interposed between axially adjacent ones of said magnets; and wherein a first set of four radially aligned magnets surround said conduit in a given region, a first adjacent pair of said magnets having their north voles in contact with said conduit and their south poles in contact with said housing, and a second adjacent pair of said magnets having their south poles in contact with said conduit and their north poles in contact with said housing, respective magnets of said first pair being diametrically opposite respective magnets of said second pair, and wherein said second set of four radially aligned magnets, adjacent to and axially spaced from said first set, are interposed between said conduit and housing, axially aligned magnets of said second set being of opposite polarity from those of said first set, and wherein the axial spacing between magnets of the first and second sets are greater than the radial spacing of magnets diametrically opposed.

2. The fluid treatment conduit assembly according to claim 1, wherein said magnets engage circumferentially alternating ones of said faces.

3. The fluid treatment conduit assembly according to claim 2, wherein said magnets are both radially and axially aligned with said conduit.

4. The fluid treatment conduit assembly according to claim 3, wherein said housing is a ferrous material.

5. A fluid treatment conduit assembly, comprising:

an elongated tubular shell;

a conduit maintained within and coaxial with said shell;

a plurality of magnets interposed between said conduit and said shell; and a plurality of spacers received within said shell, said spacers receiving and maintaining said magnets in fixed spaced apart relationship to each other, said magnets being maintained in radially aligned pairs, and said pairs being axially spaced and aligned, said magnets of each of said radially and axially spaced pairs being of opposite polarity, and said magnets of said radially spaced pairs being closer to each other than said magnets of said axially spaced pairs.

6. The fluid treatment conduit according to claim 5, wherein said spacers nestingly receive one half of each of four magnets.

7. The fluid treatment conduit according to claim 6, further comprising a pair of end spacers, one at each end of said shell, said end spacers receiving one half of each of two magnets.

8. The fluid treatment conduit according to claim 7, further comprising a conically shaped end cap at each end of said shell, said end cap receiving said conduit.

9. The fluid treatment conduit according to claim 8, wherein said shell is of a ferrous material and said spacers are of a non magnetic material.

* * * * *